Feb. 18, 1969   R. PERNICE   3,428,282
DETACHABLE HOOK BAR FOR VEHICLES
Filed Dec. 12, 1966
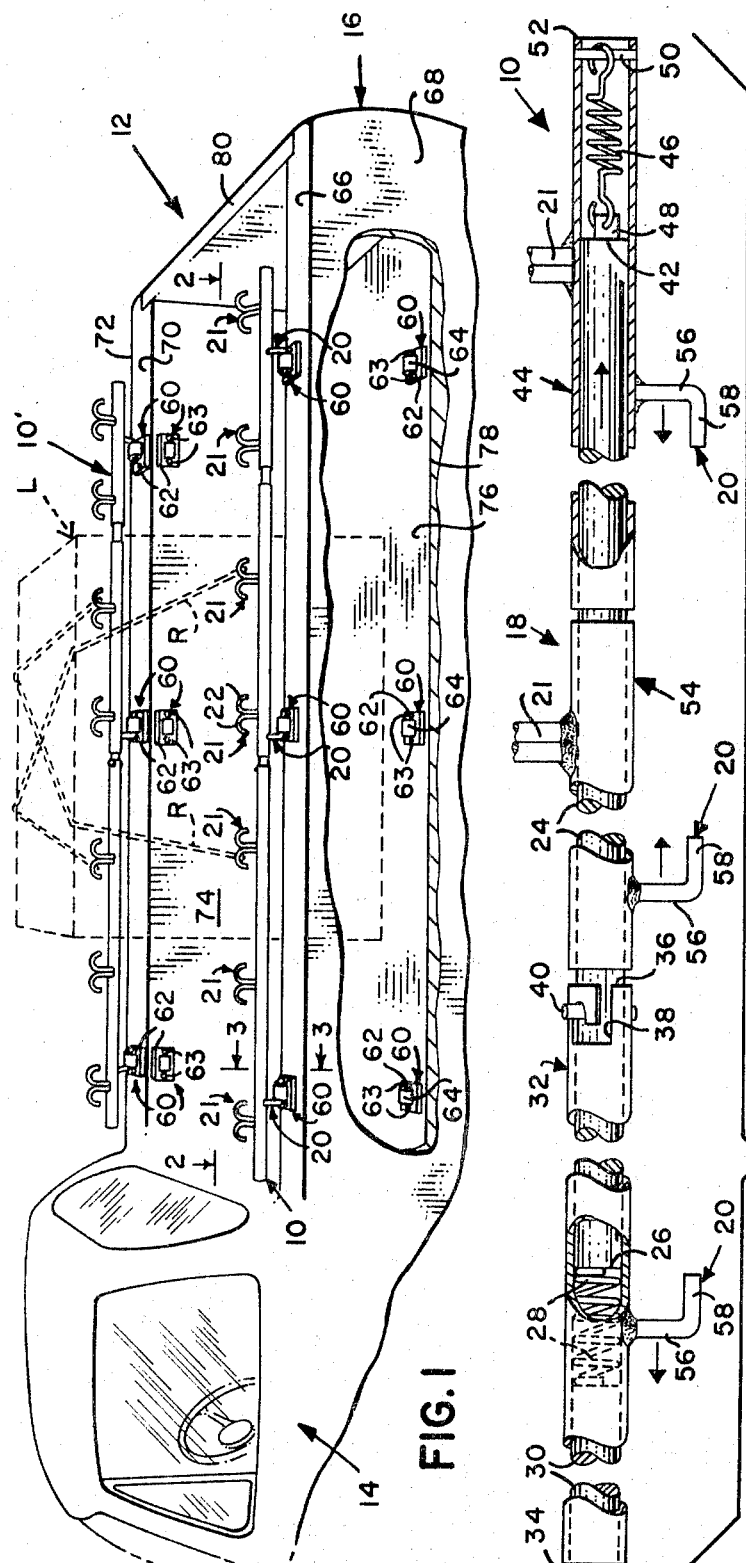
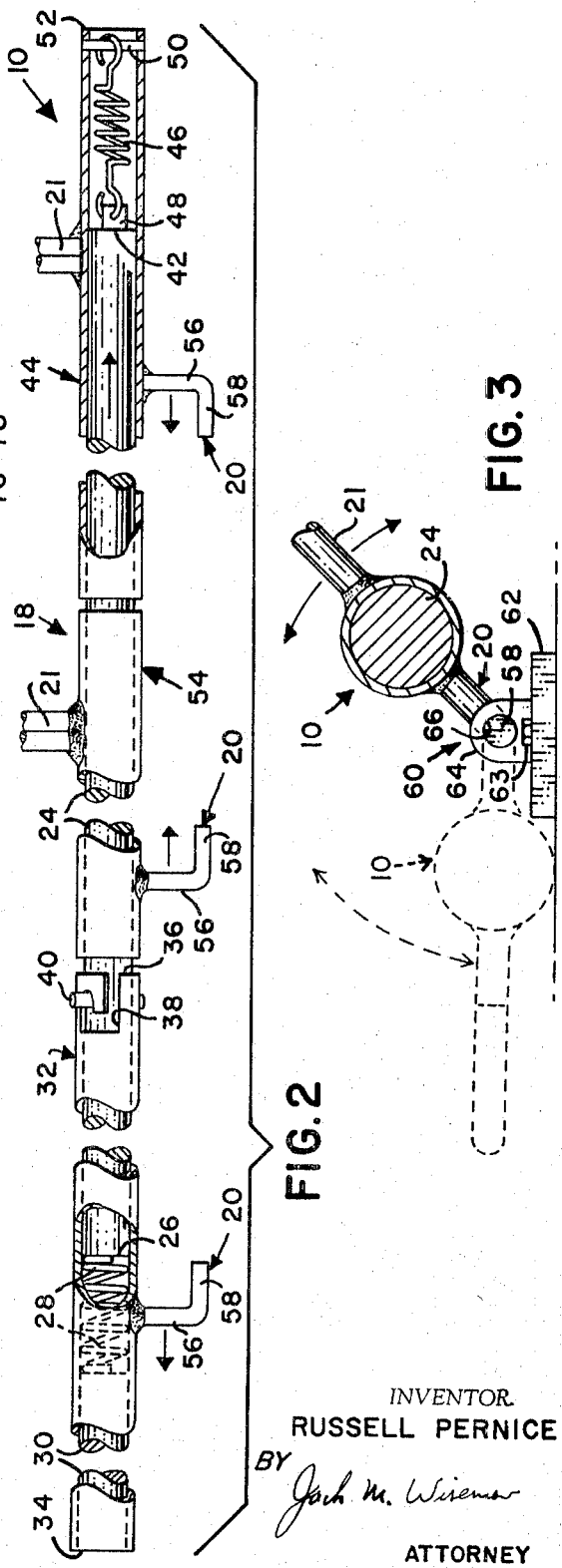
INVENTOR.
RUSSELL PERNICE
BY
Jack M. Wiseman
ATTORNEY

3,428,282
DETACHABLE HOOK BAR FOR VEHICLES
Russell Pernice, 5077 Tifton Way,
San Jose, Calif. 95118
Filed Dec. 12, 1966, Ser. No. 600,898
U.S. Cl. 248—201                                9 Claims
Int. Cl. A47b 96/06; A47f 5/08; A47h 1/14

ABSTRACT OF THE DISCLOSURE

This invention provides a hook-supporting bar, which is removably connected by mounting arms and associated brackets to a vehicle wall surface. The hooks and mounting arms are carried by sleeves positioned on a rod. Two of the sleeves are movable on the rod to adapt the bar to the length of the wall surface. The mounting arms are of angular shape and circular cross-section, thus providing positioning of the bar parallel to the wall surface, and pivotal motion of the bar about the brackets.

Specification

The present invention relates to load-carrying vehicles, such as trucks and boats, and more particularly to a bar for securing loads carried by such vehicles.

Load-carrying vehicles are commonly provided with load-securing devices. Such devices have usually taken the form of permanently-installed hooks. Thus, in the case of a pick-up truck such hooks have usually been permanently secured to a wall of the carrying box. These hooks have been employed in conjunction with tie down cord, twine or other means for securing a load in position on the vehicle.

Such load-securing hooks have, however, presented a number of disadvantages. Generally, such hooks have usually been difficult to keep clean. Also, these hooks have often interfered with vehicle-unloading operation, particularly in the case of loads of comparatively small objects. As a further disadvantage, the hooks, when not in use, have presented a safety problem to persons entering the load-carrying area of the vehicle.

Accordingly, it is an object of the present invention to provide an improved load-securing device for vehicles.

Another object of the present invention is to provide a load-securing bar for vehicles, which bar is removably mounted in operative position.

Still another object of the present invention is to provide a load-securing bar for vehicles, which bar can be adjusted in angular position to suit the requirements for a particular load.

A further object of the present invention is to provide a load-securing bar for vehicles, which bar can be adjusted in length to suit the requirements for a particular vehicle.

Other and further objects and advantages of the present invention will become apparent to one skilled in the art from the following description, taken in conjunction with the accompanying drawings, in which:

FIG. 1 is a fragmentary perspective view, being partly broken away and being partly diagrammatic, of a loaded pick-up truck equipped with two load-securing bars constructed in accordance with the present invention.

FIG. 2 is an enlarged top plan view being partly broken away and being partly in section, of a load-securing bar of the present invention, and as viewed along the lines 2—2 of FIG. 1.

FIG. 3 is a fragmentary vertical cross-sectional view, taken along the lines 3—3 of FIG. 1, and illustrating diagrammatically the pivotal movement of the load-securing bar of the present invention.

In FIG. 1 there are shown two load-securing bars 10 and 10'. The bars 10 and 10' are mounted in position on a pick-up truck 12, which includes a cab 14 and a carrying box 16. The load-securing bars 10 and 10' are of identical structure, and only the bar 10 will here be described in detail. The bar 10 (see also FIG. 2) comprises a base member 18, to which are connected three mounting arms 20, and seven load-securing members or hooks 21.

The base member 18 includes a rod 24, which is of cylindrical shape. Connected to the inner end 26 of the rod 24, by means of a cylindrical spring 28, is a cylindrical rod extension element 30. Mounted about the inner end 26 of the rod 24 and enclosing the spring 28 and the rod extension element 30 is an inner-end cylindrical sleeve 32. The sleeve 32 provides an outer end wall 34, which bears against the rod extension element 30. Formed in the sleeve 32 and extending from the open end 36 thereof is a generally hook-shaped locking slot 38. Projecting radially from the rod 24 and engaging the slot 38 is a locking pin 40. The slot 38 is maintained in tight engagement with the pin 40 by the action of the spring 28, which is under compression.

Mounted for movement on the rod 24, adjacent the outer end 42 thereof, is an outer-end cylindrical sleeve 44. The sleeve 44 is secured to the rod 24 by means of a spring 46. The spring 46 is connected between a flange 48 attached to the outer end 42 of the rod 24 and a crossbar 50 mounted within the sleeve 44 adjacent the outer end 52 thereof. Mounted on the rod 24 positioned between the sleeves 32 and 44 is a central cylindrical sleeve 54. The sleeve 54 is movable both axially and rotationally with respect to the rod 24.

The three mounting arms 20 extending from the three sleeves 32, 44 and 54, respectively. Each arm 20 is of circular cross-section. Each of the arms 20 is of angular shape and provides a radially-extending inner arm portion 56 and an axially-extending outer arm portion 58. The respective outer arm portions 58 of the two arms 20 associated respectively with the sleeves 32 and 54 project axially-outwardly with respect to the rod 24. The outer arm portion 58 of the arm 20 associated with the sleeve 44 projects axially-inwardly. The arms 20 all lie substantially in a common plane.

Three of the load-securing members or hooks 21 are attached to the sleeve 32; while two of the hook members 21 are attached to each of the sleeves 44 and 54. Each hook member 21 is formed of two oppositely-directed elements, or hooks 22. All of the hooks 22 lie substantially in a common plane. The direction of projection of the hook members 21 from the base member 18 is generally opposite to the direction of projection of the mounting arms 20.

The load-securing bars 10 and 10' are mounted on the carrying box 16 by means of a set of three mounting brackets 60. Each of the brackets 60 (see also FIG. 3) includes a base plate 62 and is provided with attachment bolts 63. An arm support element 64 projects from each base plate 62. Cut through each of the elements 64 is a bore 66, which is of a size suitable to receive one of the outer mounting arm portions 58.

The brackets 60 for supporting the bar 10 are attached by the respective bolts 63 to the upper edge surface 66 of the left side wall 68 of the carrying box 16. The brackets 60 for supporting the bar 10' are similarly attached to the upper edge surface 70 of the right side wall 72 of the carrying box 16. A set of three brackets 60 is also mounted on the inner surface 74 of the wall 72. An additional set of three brackets 60 (not shown) is mounted on the inner surface 74 of the wall 72. An additional set of three brackets 60 (not shown) is mounted on the inner surface (not shown) of the wall 68. A further set of three brackets 60 is mounted on the inner surface 76 of the bottom wall 78 of the carrying box 16. The three brackets 60 of each set are longitudinally spaced along the respective mounting surface 66, 70, 74 or 76. Thus, for each set, a first, or inner-end, bracket 60 is positioned against the cab 14. A second, or outer-end, bracket is positioned adjacent the gate 80 of the carrying box 16. A third, or central, bracket is positioned intermediate the first and second brackets.

In mounting the load-securing bar 10 on the surface 66, the sleeve 32 is initially connected to the inner-end bracket 60. This is accomplished by manually inserting the respective outer arm portion 58 through the associated bore 66. The sleeve 54 is then adjusted into position for connection to the central bracket 60, and the outer arm portion 58 of the respectively-associated mounting arm 20 is inserted into the associated bore 66. The sleeve 44 is then drawn axially-outwardly with respect to the rod 24, and so as to position the respectively-associated mounting arm 20 for insertion of the respective outer arm portion 58 into the bore 66 of the outer-end bracket 60. The sleeve 44 is then released, allowed to be drawn inwardly by the spring 46, and manually guided to effect the insertion into the outer-end bracket 60. The spring 46 then serves to maintain the bar 10 in mounted position with the mounting arms 20 engaging the respectively associated brackets 60. In such mounted position, the bar 10 lies substantially parallel to the surface 66.

The bar 10, in cooperation with the bar 10', which has been similarly mounted on the surface 70, may then be employed to secure a load, such as seen and, within the carrying box 16. The load L is tied down by retaining means R, which may, e.g., be rope or twine. The retaining means R engages a suitable number of the hooks 22 projecting from the bars 10 and 10'. In bringing the retaining means R into engagement with the hooks 22, the bars 10 and 10' may each be pivoted about the respective brackets 60 and into the most suitable position for use in the manner illustrated in FIG. 3.

After the load L has been removed from the carrying box 16, the 10 and 10' can be detached. The detaching procedure is generally the reverse of the procedure already described for the mounting of the bar 10.

If desired, the bars 10 and 10' may be mounted on the respective inner surfaces of the side walls 68 and 72; or on the bottom wall surface 76. In addition to their use on trucks, the bars 10 and 10' may be employed wherever loads are to be secured, such as, e.g., on railroad trains, airplanes, boats and ships. The bars 10 and 10' are adapted to use on load-bearing surfaces of varying lengths as a result of the adjustability in position of the sleeves 44 and 54.

It is to be understood that modifications and variations of the embodiments of the invention disclosed herein may be resorted to without departing from the spirit of the invention and the scope of the appended claims.

Having thus described my invention, what I claim as new and desire to protect by Letters Patent is:

1. A load-securing bar for a vehicle comprising:
    (a) a base member, said base member comprises a rod, and a plurality of sleeves carried by said rod;
    (b) mounting means connected to said base member and adapted for removable attachment to a surface of a load-carrying vehicle, said mounting means comprises a mounting element associated with each of said sleeves, at least one of said sleeves being movable with respect to said rod for varying the position of the mounting element associated therewith; and
    (c) at least one load-securing element connected to said base member and adapted for engagement by retaining means for a load carried by said vehicle.

2. A load-securing bar in accordance with claim 1, in which said base member comprises a movable sleeve connected to one end of said rod, said movable sleeve being adapted for movement to vary the length of said base member.

3. A load-securing bar in accordance with claim 1, in which said rods is provided with a locking pin, one of said sleeves being formed with a slot adapted to engage said locking pin, and means including a spring disposed in engagement with said rod for maintaining said locking pin in engagement with said slot.

4. A load-securing bar in accordance with claim 1, in which one of said sleeves is adapted for both axial and rotational movement with respect to said rod.

5. A load-securing bar in accordance with claim 1, in which said mounting means include a plurality of mounting arms, said mounting arms being adapted to engage respectively a plurality of brackets connected to said surface.

6. A load-securing bar in accordance with claim 5, in which each of said mounting arms is of angular shape, each arm being formed with an outer-end portion adapted to engage the associated bracket.

7. A load-securing bar in accordance with claim 6, in which each outer-end portion is of cylindrical shape and adapted for rotational movement within the respective bracket, whereby said base member is pivotable about said brackets.

8. A load-securing bar in accordance with claim 1, in which each of said load-securing elements is a hook.

9. A load-securing bar in accordance with claim 1, in which said mounting means project from said base member in a first direction, each of said load-securing elements projecting from said base member in a direction opposite to said first direction.

References Cited

UNITED STATES PATENTS

| | | | |
|---|---|---|---|
| 1,392,343 | 10/1921 | Leishman | 280—179 |
| 1,485,989 | 3/1924 | Moore | 211—105.6 |

FOREIGN PATENTS

| | | |
|---|---|---|
| 148,828 | 9/1951 | Australia. |

CHANCELLOR E. HARRIS, *Primary Examiner.*

J. FRANKLIN FOSS, *Assistant Examiner.*

U.S. Cl. X.R.

248—223, 361; 280—179; 211—123